United States Patent
Zhao et al.

(10) Patent No.: US 12,050,640 B2
(45) Date of Patent: Jul. 30, 2024

(54) PROBABILISTIC PROCEDURE PLANNING FOR INSTRUCTIONAL VIDEOS

(71) Applicant: SAMSUNG ELECTRONICS CO., LTD., Suwon-si (KR)

(72) Inventors: He Zhao, Richmond Hill (CA); Mikita Andreevich Dvornik, Toronto (CA); Isma Hadji, London (GB); Richard Wildes, Toronto (CA); Konstantinos Derpanis, Toronto (CA); Allan Douglas Jepson, Oakville (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 91 days.

(21) Appl. No.: 17/984,685

(22) Filed: Nov. 10, 2022

(65) Prior Publication Data

US 2023/0153344 A1    May 18, 2023

Related U.S. Application Data

(60) Provisional application No. 63/279,982, filed on Nov. 16, 2021.

(51) Int. Cl.
*G06F 16/00* (2019.01)
*G06F 16/532* (2019.01)
*G06N 7/01* (2023.01)

(52) U.S. Cl.
CPC ............ *G06F 16/532* (2019.01); *G06N 7/01* (2023.01)

(58) Field of Classification Search
CPC .......................... G06F 16/532; G06F 16/4393
See application file for complete search history.

(56) References Cited

U.S. PATENT DOCUMENTS

| 8,180,717 | B2 * | 5/2012 | King | ...................... G06N 20/00 706/45 |
| 10,970,601 | B2 | 4/2021 | Kajimoto et al. | |

(Continued)

FOREIGN PATENT DOCUMENTS

| JP | 2010-266975 A | 11/2010 |
| KR | 10-1058471 B1 | 8/2011 |

(Continued)

OTHER PUBLICATIONS

Bi, J., et al., "Procedure Planning in Instructional Videos via Contextual Modeling and Modelbased Policy Learning", 2021 IEEE/CVF International Conference on Computer Vision (ICCV), pp. 15591-15600, (Oct. 10-17, 2021), DOI: 10.1109/ICCV48922.2021.01532.

(Continued)

*Primary Examiner* — Noosha Arjomandi
(74) *Attorney, Agent, or Firm* — Sughrue Mion, PLLC

(57) ABSTRACT

The present disclosure provides methods and apparatuses for probabilistic procedure planning for generating a plan based on a goal relating to an end state. In some embodiments, a method includes receiving a request from a user to generate an action plan comprising T intermediate actions between a start state and the end state. The method further includes constructing an input query matrix based on T, the start state, the end state, positional encodings, and pseudo-random noise information. The method further includes generating, using a machine learning transformer decoder, the action plan based on the input query matrix and a plurality of learnable vectors. The method further includes providing the action plan to the user. The action plan indicates a probability distribution of a plurality of distinct action sequences, to be performed by the user, that transform the start state to the end state.

20 Claims, 7 Drawing Sheets

(56) References Cited

U.S. PATENT DOCUMENTS

| | | | |
|---|---|---|---|
| 11,139,062 B2* | 10/2021 | Venkataraman | G16H 20/40 |
| 11,288,609 B2* | 3/2022 | Fox | G06N 5/046 |
| 11,542,787 B2* | 1/2023 | Fox | E21B 41/00 |
| 2006/0167917 A1* | 7/2006 | Solomon | G05B 19/418 |
| 2011/0238614 A1* | 9/2011 | Yoon | G06N 20/00 |
| | | | 706/52 |
| 2018/0091613 A1* | 3/2018 | Goel | H04L 51/224 |
| 2021/0006752 A1* | 1/2021 | Garcia Kilroy | G11B 27/10 |
| 2021/0256434 A1* | 8/2021 | Dubey | G06Q 10/06316 |
| 2022/0198324 A1* | 6/2022 | Kishimoto | G06F 17/18 |
| 2022/0327287 A1* | 10/2022 | Agrawal | G06F 40/216 |
| 2023/0076024 A1* | 3/2023 | Baek | H04L 9/30 |
| 2023/0101930 A1 | 3/2023 | Ritter et al. | |
| 2023/0154463 A1* | 5/2023 | Choi | G06F 3/167 |
| | | | 704/251 |
| 2023/0259703 A1* | 8/2023 | Geraci | G06Q 30/02 |
| | | | 704/9 |
| 2023/0274124 A1* | 8/2023 | Moser | G06N 5/04 |
| | | | 706/11 |
| 2023/0316055 A1* | 10/2023 | Chowdhery | G06N 3/0499 |
| | | | 706/16 |
| 2023/0334320 A1* | 10/2023 | Zhang | G06N 3/0495 |
| 2023/0376851 A1* | 11/2023 | Lee | G06N 20/00 |

FOREIGN PATENT DOCUMENTS

| | | |
|---|---|---|
| KR | 10-1990742 B1 | 6/2019 |
| KR | 10-2021-0028554 A | 3/2021 |
| WO | 2021/156513 A1 | 8/2021 |

OTHER PUBLICATIONS

Chang, C., et al., "Procedure Planning in Instructional Videos", 19 pages, (Apr. 13, 2020), https://doi.org/10.48550/arXiv.1907.01172.

International Search Report (PCT/ISA/210) issued Feb. 23, 2023 from the International Searching Authority in International Application No. PCT/KR2022/017958.

Written Opinion (PCT/ISA/237) issued Feb. 23, 2023 from the International Searching Authority in International Application No. PCT/KR2022/017958.

Notification of Transmittal of the International Search Report and the Written Opinion of the International Searching Authority, or the Declaration (PCT/ISA/220) issued Feb. 23, 2023 from the International Searching Authority in International Application No. PCT/KR2022/017958.

* cited by examiner

PROBABILISTIC PROCEDURE PLANNING FOR INSTRUCTIONAL VIDEOS

CROSS-REFERENCE TO RELATED APPLICATIONS

This application claims benefit of priority under 35 U.S.C. § 119 to U.S. Provisional Patent Application No. 63/279,982, filed on Nov. 16, 2021, in the U.S. Patent and Trademark Office, the disclosure of which is incorporated by reference herein in its entirety.

BACKGROUND

1. Field

The present disclosure relates generally to procedure planning, and more particularly to methods and apparatuses for probabilistic procedure planning for generating a plan based on a goal relating to an end state.

2. Description of Related Art

Procedure planning may refer to processes and/or techniques for planning out a sequence of actions (e.g., a plan) that may transform an environment from an initial start state to a desired end state. A capability of performing procedure planning may be an important feature for next-level artificial intelligence (AI) systems capable of analyzing and/or mimicking human behavior, and/or assisting humans in goal-directed problem solving, such as, but not limited to, cooking, assembling furniture, automobile repair. That is, AI systems that may solve goal-directed problems with solutions that may be represented as a set of instructions.

Related approaches for procedure planning for instructional videos typically rely on fully-supervised learning models that may be trained using visual representations of each intermediate step along with annotations of the start and end times of each intermediate step and step labels. Such annotations may be generated via laborious and error-prone processes of observing instructional videos and manually annotating the start and end times of the intermediate steps. Moreover, related procedure planning systems may utilize a two-branch autoregressive model in which one branch may be dedicated to predicting actions based on the previous observation, while the other branch may approximate the observation given the previous action in a step-by-step manner. However, these related models may be cumbersome and/or may compound errors, particularly for longer action sequences. In addition, these related models may fail to model the uncertainty inherent to the procedure planning tasks. For example, given the initial start state, multiple action sequences may be taken to achieve the same desired end state. However, these related models may provide only one possible action sequence as an output.

Thus, there exists a need for further improvements to procedure planning. Improvements are presented herein. These improvements may also be applicable to other goal-directed problem solving technologies and/or other AI technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods and apparatuses for probabilistic procedure planning for generating a plan based on a goal relating to an end state are disclosed by the present disclosure.

According to an aspect of the present disclosure, a method of probabilistic procedure planning for generating a plan based on a goal relating to an end state, to be performed by a processor. The method includes receiving a request from a user to generate an action plan comprising T intermediate actions between a start state and the end state. The start state and the end state are indicated by the request. T is an integer greater than 0. The method further includes constructing an input query matrix based on T, the start state, the end state, positional encodings, and pseudo-random noise information. The method further includes generating, using a machine learning transformer decoder, the action plan based on the input query matrix and a plurality of learnable vectors. The method further includes providing the action plan to the user. The action plan indicates a probability distribution of a plurality of distinct action sequences, to be performed by the user, that transform the start state to the end state. Each action sequence of the plurality of distinct action sequences has T intermediate actions.

In some embodiments, the method may further include training the machine learning transformer decoder using a weakly supervised approach by inputting a plurality of start states and end states and a plurality of natural language (NL) descriptions of actions.

In some embodiments, the method may further include selecting a desired action plan from among the plurality of distinct action sequences based on at least one of efficiency criteria and safety criteria.

In some embodiments, the receiving of the request may include receiving the request to generate the action plan, the request comprising a value of T.

In some embodiments, the constructing of the input query matrix may include calculating a first embedded vector corresponding to the start state, calculating a last embedded vector corresponding to the end state, obtaining T−1 constant learned query vectors, generating T+1 positional embeddings, combining the T+1 positional embeddings with the first embedded vector, the last embedded vector, the T−1 constant learned query vectors to result in T+1 positionally embedded vectors, stacking the T+1 positionally embedded vectors into a deterministic query matrix, and concatenating a pseudo-random noise vector to each column of the deterministic query matrix to construct the input query matrix.

In some embodiments of the method, dimensions of each of the first embedded vector, the last embedded vector, and the T−1 constant learned query vectors may be a same dimension.

In some embodiments, the generating of the action plan may include performing a multi-head self-attention operation on the input query matrix, performing a multi-head cross-attention operation on a result of the multi-head self-attention operation using the plurality of learnable vectors, and processing a result of the multi-head cross-attention operation with a multi-layer perceptron (MLP) to generate a one-hot encoded action vector for each of the T intermediate actions.

In some embodiments of the method, the plurality of learnable vectors may correspond to operations of an appliance.

In some embodiments of the method, at least one of the start state and the end state may be indicated by an image.

In some embodiments of the method, at least one of the start state and the end state may be indicated by video content.

In some embodiments of the method, the video content may be encoded using multiple instance learning noise contrastive estimation (MIL-NCE).

In some embodiments of the method, the plurality of distinct action sequences may indicate intermediate instructions to be followed by the user to reach the end state.

According to an aspect of the present disclosure, an apparatus for probabilistic procedure planning for generating a plan based on a goal relating to an end state is provided. The apparatus includes a memory storage storing computer-executable instructions, and a processor communicatively coupled to the memory storage. The processor is configured to execute the computer-executable instructions and cause the apparatus to receive a request from a user to generate an action plan comprising T intermediate actions between a start state and an end state. The start state and the end state are indicated by the request. T is an integer greater than 0. The computer-executable instructions further causes the apparatus to construct an input query matrix based on T, the start state, the end state, positional encodings, and pseudo-random noise information. The computer-executable instructions further causes the apparatus to generate, using a machine learning transformer decoder, the action plan based on the input query matrix and a plurality of learnable vectors. The computer-executable instructions further causes the apparatus to provide the action plan to the user. The action plan indicates a probability distribution of a plurality of distinct action sequences, to be performed by the user, that transform the start state to the end state. Each action sequence of the plurality of distinct action sequences has T intermediate actions.

In some embodiments, the processor may be further configured to execute further computer-executable instructions and may further cause the apparatus to train the machine learning transformer decoder using a weakly supervised approach by inputting a plurality of start states and end states and a plurality of NL descriptions of actions.

In some embodiments, the processor may be further configured to execute further computer-executable instructions and may further cause the apparatus to select a desired action plan from among the plurality of distinct action sequences based on at least one of efficiency criteria and safety criteria.

In some embodiments, the processor may be further configured to execute further computer-executable instructions and may further cause the apparatus to receive the request to generate the action plan, the request comprising a value of T.

In some embodiments, the processor may be further configured to execute further computer-executable instructions and may further cause the apparatus to calculate a first embedded vector corresponding to the start state, calculate a last embedded vector corresponding to the end state, obtaining T−1 constant learned query vectors, generating T+1 positional embeddings, combining the T+1 positional embeddings with the first embedded vector, the last embedded vector, the T−1 constant learned query vectors to result in T+1 positionally embedded vectors, stacking the T+1 positionally embedded vectors into a deterministic query matrix, and, and concatenate a pseudo-random noise vector to each column of the deterministic query matrix to construct the input query matrix. Dimensions of each of the first embedded vector, the last embedded vector, and the T−1 constant learned query vectors may be a same dimension.

In some embodiments, the computer-executable instructions to generate the action plan may further cause the apparatus to perform a multi-head self-attention operation on the input query matrix, perform a multi-head cross-attention operation on a result of the multi-head self-attention operation using the plurality of learnable vectors, and process a result of the multi-head cross-attention operation with an MLP to generate a one-hot encoded action vector for each of the T intermediate actions.

In some embodiments of the apparatus, at least one of the start state and the end state may be indicated by an image, or at least one of the start state and the end state may be indicated by video content, wherein the video content is encoded using MIL-NCE.

In some embodiments of the apparatus, the plurality of distinct action sequences may indicate intermediate instructions to be followed by the user to reach the end state.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
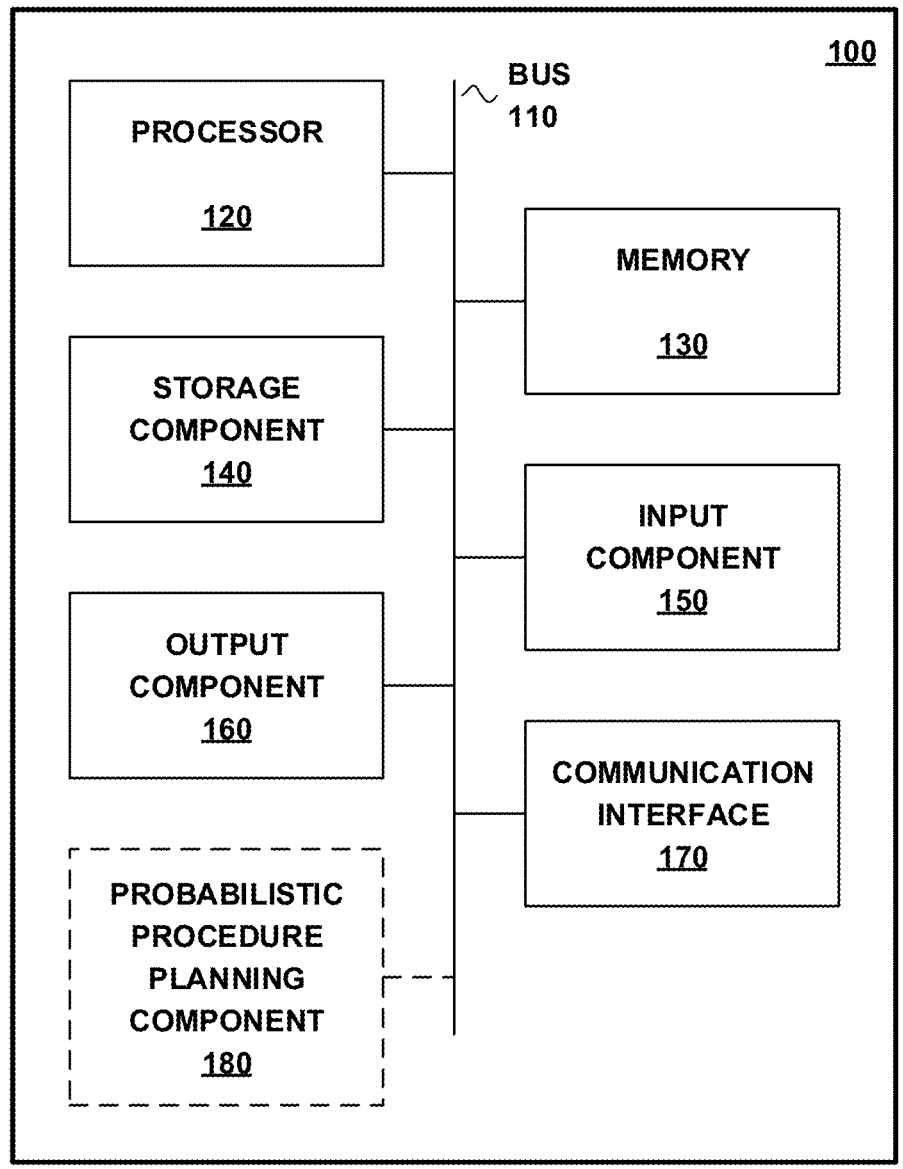
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

As a general introduction to the subject matter described in more detail below, aspects described herein are directed towards systems, devices, and methods for probabilistic procedure planning for generating a plan based on a goal relating to an end state.

In aspects described herein, for generating a plan based on a goal relating to an end state, a processor may receive a request from a user to generate an action plan comprising T intermediate actions between a start state and the end state. The start state and the end state may be indicated by the request, and T may be an integer greater than 0. In other aspects described herein, the processor may construct an input query matrix based on T, the start state, the end state, positional encodings, and pseudo-random noise information. In other aspects described herein, the processor may generate, using a machine learning transformer decoder, the action plan based on the input query matrix and a plurality of learnable vectors. In other aspects described herein, the processor may provide the action plan to the user. The action plan may indicate a probability distribution of a plurality of distinct action sequences, to be performed by the user, that transform the start state to the end state. Each action sequence of the plurality of distinct action sequences may have T intermediate actions.

The aspects described herein provide advantages over related procedure planning approaches by providing a weakly supervised approach for procedure planning, which may leverage language representations, rather than visual representations, of intermediate steps. Aspects described herein may further provide a single branch non-auto-regressive model that may generate all intermediate steps in parallel, rather than relying on a two-branch auto-regressive approach that may be used in related procedure planning approaches. Alternatively or additionally, aspects described herein may provide multiple feasible plans that address the uncertainty inherent to the procedure planning tasks.

As noted above, certain embodiments are discussed herein that relate to probabilistic procedure planning for generating a plan based on a goal relating to an end state. Before discussing these concepts in further detail, however, an example of a computing device that may be used in implementing and/or otherwise providing various aspects of the present disclosure will first be discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or comprise a desktop computer, a computer server, a mobile device (e.g., a laptop computer, a tablet computer, a smart phone, any other type of mobile computing device, etc.), and/or any other type of data processing device.

For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may comprise a set of components, such as a processor 120, a memory 130, a storage component 140, an input component 150, an output component 160, a communication interface 170, and a probabilistic procedure planning component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The present disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a neural processing unit (NPU), an AI-dedicated processor designed to have a hardware structure specified to process an AI model, a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the probabilistic procedure planning component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may comprise a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may comprise one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may comprise a sensor for sensing information (e.g., a global positioning system (GPS) component, an accelerometer, a gyroscope, an actuator, and the like).

The output component 160 of device 100 may comprise one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may comprise a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as UWB, FlashLinQ, WiMedia, Bluetooth, ZigBee, Wi-Fi, LTE, 5G, and the like. In other embodiments, the communication interface 170 may comprise an Ethernet interface, an optical interface, a coaxial interface, an infrared interface, a radio frequency (RF) interface, or the like.

In some embodiments, the device 100 may comprise the probabilistic procedure planning 180 configured to generate a plan based on a goal relating to an end state. The probabilistic procedure planning component 180 may be configured to receive a request from a user to generate an action plan comprising T intermediate actions between a start state and the end state, construct an input query matrix based on T, the start state, the end state, positional encodings, and pseudo-random noise information, generate the action plan based on the input query matrix and a plurality of learnable vectors, and provide the action plan to the user.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may comprise memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to probabilistic procedure planning for generating a plan based on a goal relating to an end state. In the description below, various examples illustrate a weakly supervised approach to probabilistic procedure planning to generate a plan based on a goal relating to an end state using a single branch model that may generate all intermediate steps in parallel, in accordance with one or more embodiments.

Figure 2:
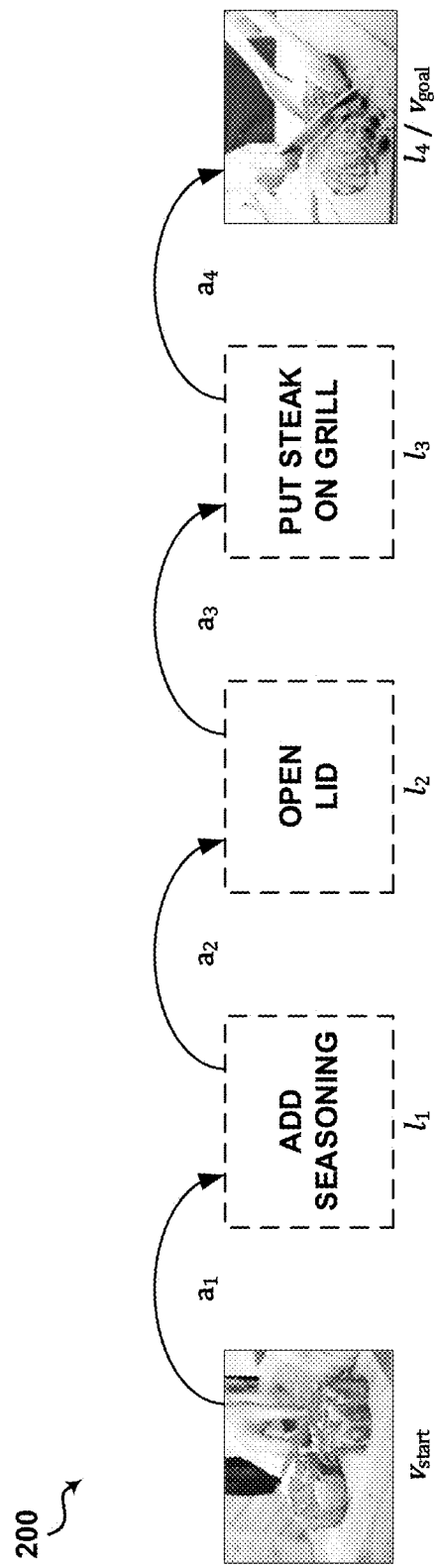
FIG. 2 illustrates an example plan of probabilistic procedure planning, in accordance with various aspects of the present disclosure.

FIG. 2 illustrates an example plan of probabilistic procedure planning, in accordance with various aspects of the present disclosure.

Referring to FIG. 2, an example plan 200 of probabilistic procedure planning that implements one or more aspects of the disclosure is illustrated. In some embodiments, at least a portion of probabilistic procedure planning to generate the example plan 200 may be performed by the device 100 of FIG. 1, which may include the probabilistic procedure planning component 180. Alternatively or additionally, another computing device (e.g., a server, a laptop, a smartphone, a user equipment (UE), a wearable device, etc.) that includes the probabilistic procedure planning component 180 may perform at least a portion of the probabilistic procedure planning to generate the example plan 200.

In some embodiments, the device 100 may receive a request from a user to generate an action plan comprising T intermediate actions between a start state and the end state, where T is an integer greater than 0. For example, the user may perform one or more user input actions, via input component 150, to request the device 100 to generate the action. Alternatively or additionally, the device 100 may receive, via communication interface 170, the request from the user to generate the action plan. For example, the device 100 may receive, from another computing device (e.g., a server, a laptop, a smartphone, a UE, a wearable device, etc.), a message comprising the request from the user. The present disclosure is not limited in this regard.

In some embodiments, the start state and the end state may be indicated by the request. For example, at least one of the start state and the end state may be indicated by an image. Alternatively or additionally, at least one of the start state and the end state may be indicated by video content. For example, the video content may be encoded using multiple instance learning noise contrastive estimation (MIL-NCE). In other optional or additional embodiments, at least one of the start state and the end state may be indicated by a text description of the state.

In some embodiments, the request may include a value of T.

Given the start state, the goal state, and the time horizon T (e.g., number of intermediate steps), the device 100 may perform probabilistic procedure planning to generate feasible sequences of discrete action labels for transforming the start state to the goal step in the time horizon. That is, the sequences of discrete action labels may indicate intermediate instructions to be followed by the user to reach the end state from the start state.

For example, as shown in FIG. 2, the device 100 may generate the example plan 200 conditioned on the visual start state $V_{start}$ (e.g., raw steak as shown in FIG. 2), the desired visual goal state $V_{goal}$ (e.g., slicing cooked steak as shown in FIG. 2), and a time horizon T, where T is equal to 4. In some embodiments, given this input, a probabilistic procedure planning component 180 of the device 100 may generate the example plan 200 that may indicate a feasible sequence of four discrete action labels (e.g., $a_1$, $a_2$, $a_3$, and $a_4$) for transforming the start state $V_{start}$ to the goal state $V_{goal}$ Alternatively or additionally, the probabilistic procedure planning component 180 may generate a probability distribution of a plurality of feasible sequences of actions for the given input (not shown).

In some embodiments, the probabilistic procedure planning component 180 may map visual activities and their natural language (NL) descriptions to a common representational space thereby making embedded vision features interchangeable with language features for training a probabilistic T-step plan generator (of probabilistic procedure planning component 180), as described in further detail below in reference to FIG. 3.

Referring to FIG. 2, the four natural language (NL) descriptions (e.g., $1_1$, $1_2$, $1_3$, and $1_4$) may correspond to the four discrete action labels (e.g., $a_1$, $a_2$, $a_3$, and $a_4$) for transforming the start state $V_{start}$ to the goal state $V_{goal}$ For example, the first discrete action label $a_1$ may transform the start state $V_{start}$ to a first intermediate step described by NL description $1_1$ (e.g., "Add seasoning"), the second discrete action label $a_2$ may transform the first intermediate state to a second intermediate step described by NL description $1_2$ (e.g., "Open lid"), the third discrete action label $a_3$ may transform the second intermediate state to a third intermediate step described by NL description $1_3$ (e.g., "Put steak on grill"), and the fourth discrete action label $a_4$ may transform the third intermediate state to a fourth intermediate step described by NL description $1_4$ that also corresponds to the goal state $V_{goal}$.

In some embodiments, the device 100 may provide the example plan 200 to the user. For example, the device 100 may present, via the output component 160, the example plan 200 to the user, such as, but not limited to, displaying the example plan 200 on a display, reading the example plan 200 to the user over a speaker, and the like. Alternatively or additionally, the device 100 may provide, via communication interface 170, the example plan 200 to the user. For example, the device 100 may send, to another computing device (e.g., a server, a laptop, a smartphone, a UE, a wearable device, etc.), a message comprising the example plan 200. The present disclosure is not limited in this regard The example plan 200 may indicate a probability distribution of a plurality of distinct action sequences, to be performed by the user, that transform the start state to the end state. Each action sequence of the plurality of distinct action sequences may have T intermediate actions.

Advantageously, the probabilistic T-step plan generator may be trained using the NL descriptions rather than visual representations of each intermediate step, thus possibly obviating a need to perform manual annotations of the start and end times of the intermediate steps in instructional videos, that are typically required by related procedure planning approaches.

It is understood that even though the example plan 200 illustrated in FIG. 2 is based on a particular start state, a particular goal state, and a certain number of intermediate steps, that other example plans may be generated based on the present disclosure. For example, in some embodiments, the example plan 200 may be based on a smaller or larger number of intermediate steps, a different start state, and/or a different goal state without deviating from the scope of the present disclosure. The present disclosure is not limited in this regard.

Figure 3:
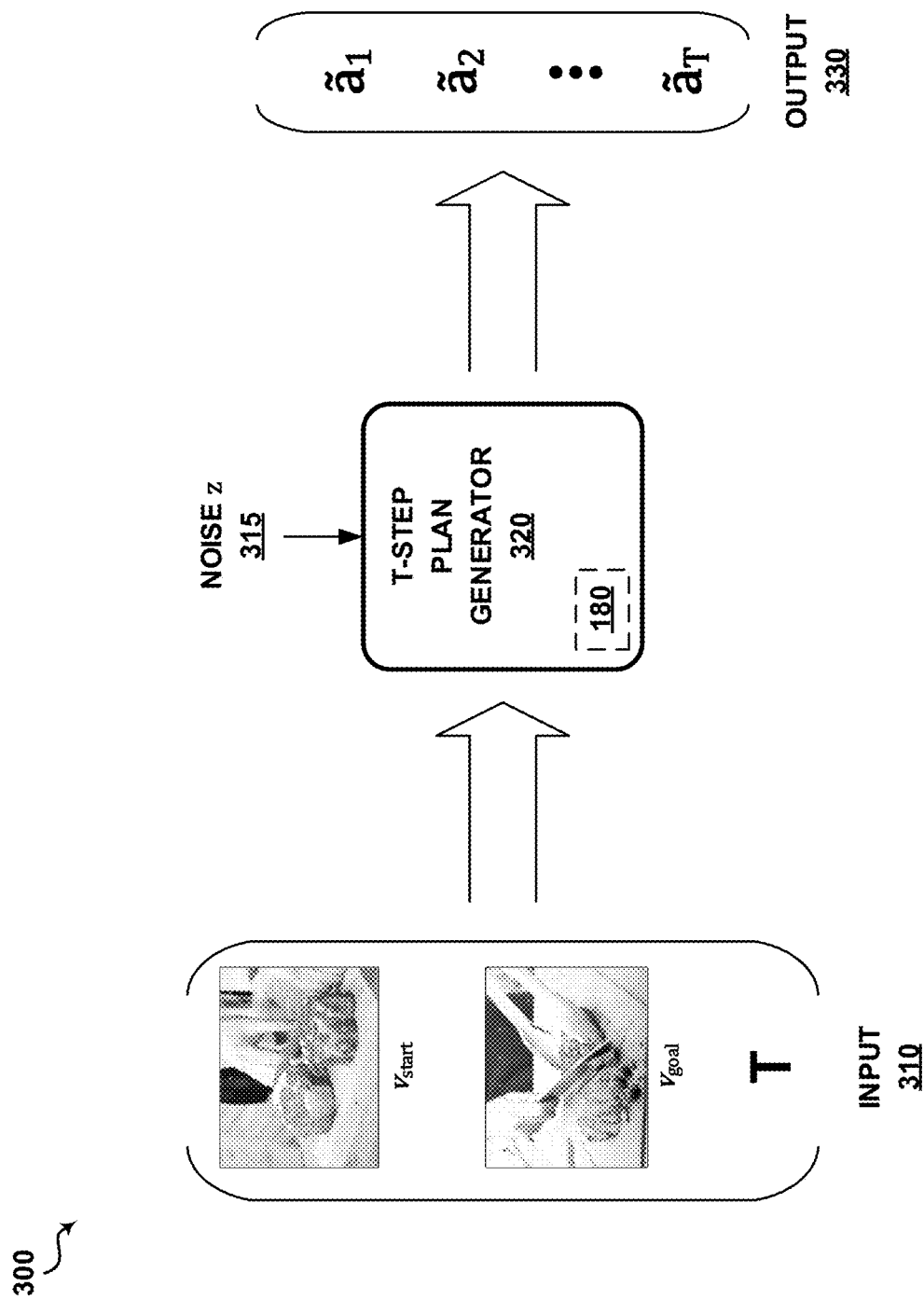
FIG. 3 depicts an example of a probabilistic T-step plan generator, in accordance with various aspects of the present disclosure.
Figure 4:
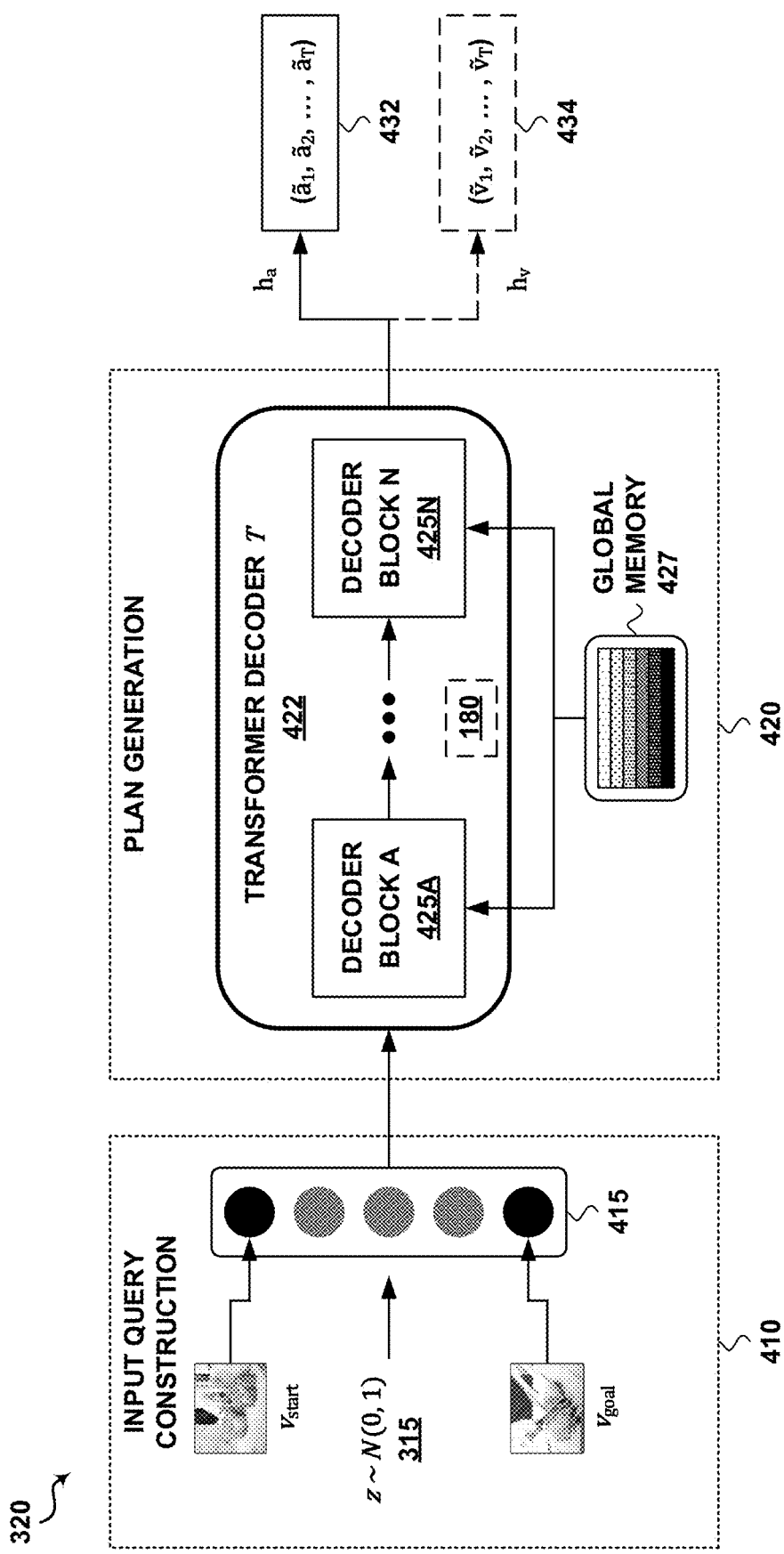
FIG. 4 illustrates a block diagram of a probabilistic T-step plan generator, in accordance with various aspects of the present disclosure.
Figure 5:
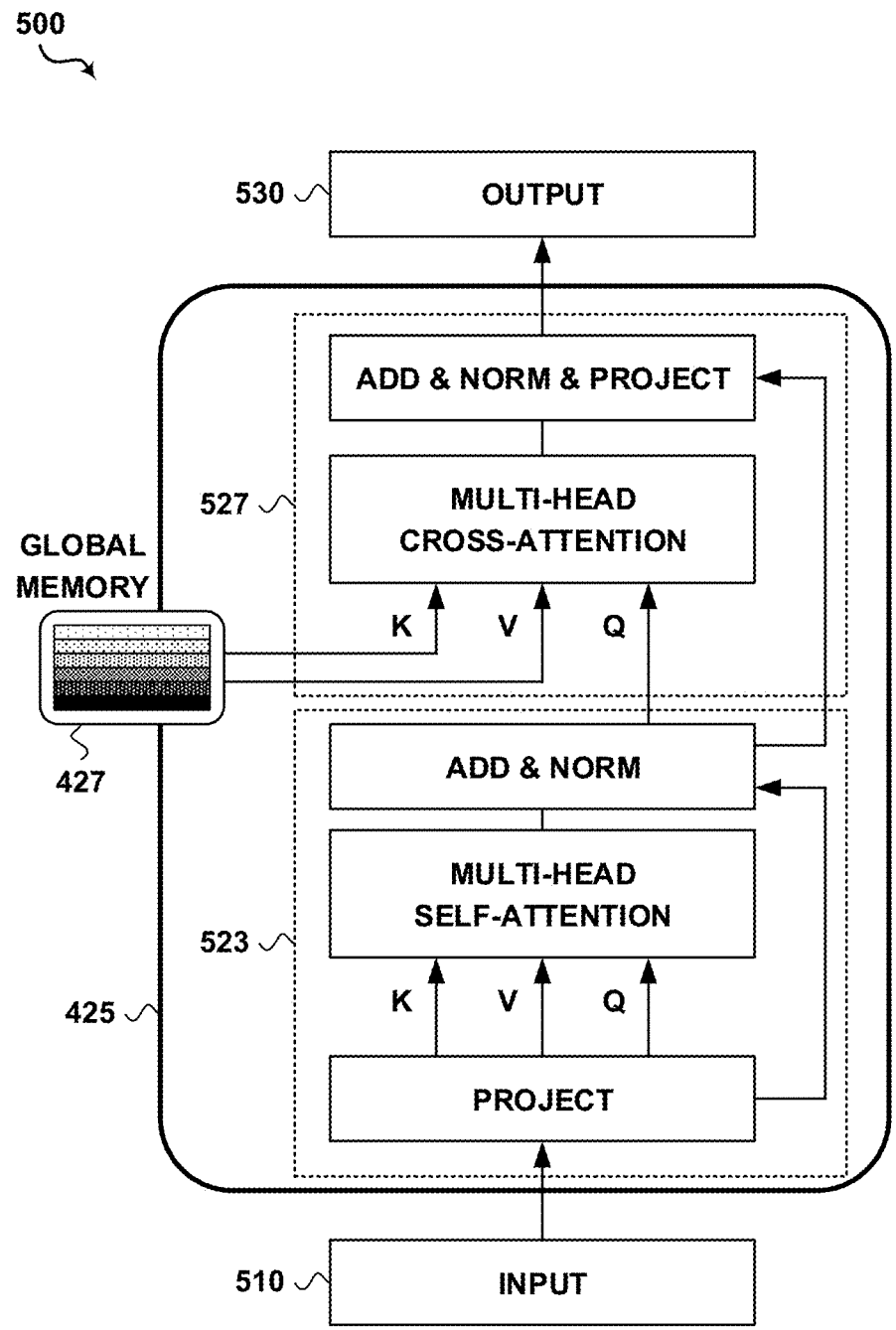
FIG. 5 depicts an example of a memory-augmented transformer block, in accordance with various aspects of the present disclosure.

Having discussed an example plan generated by probabilistic procedure planning according to various aspects of the present disclosure, a number of optional or additional embodiments are now discussed in further detail in reference to FIGS. 3-5. In particular, and as introduced above, some aspects of the present disclosure provide a probabilistic T-step plan generator that can be trained from information available from instructional videos and natural language instructions. Alternatively or additionally, the probabilistic T-step plan generator may generate a distribution over possible plans to capture an uncertainty that may be inherent in procedure planning. In the description below, various examples illustrate a weakly supervised approach to probabilistic procedure planning that may not require manual video annotation and instead may only require visual start and goal states along with intermediate step descriptions in natural language for training.

Some aspects of the present disclosure provide methods and apparatuses for a probabilistic T-step plan generator that may generate sequences of actions (e.g., plans) that may transform an environment from a given visual start state to a desired visual goal state. Such a probabilistic T-step plan generator may be useful for building next-generation artificial intelligence (AI) systems capable of analyzing and/or mimicking human behavior, and/or assisting humans in goal-directed problem solving, such as, but not limited to, cooking, assembling furniture, automobile repair. That is, the AI systems may solve goal-directed problems with solutions that may be represented as a set of instructions.

Related procedure planning systems may output a single plan that results from a deterministic function of a start state and a goal state provided to the related procedure planning systems. As such, the related procedure planning systems may not model uncertainties that may be inherent to a procedure planning task. For example, given a set of ingredients and a goal of making a pancake, one possible set of intermediate steps may be "add wet ingredients to bowl", "add dry ingredients to bowl," and "whisk mixture," and another possible set of intermediate steps may be "add dry ingredients to bowl", "add wet ingredients to bowl," and "whisk mixture." For another example, given a set of ingredients and a goal of making a pizza, one possible set of intermediate steps may be "prepare dough", "prepare sauce," and "assemble pizza," and another possible set of intermediate steps may be "prepare sauce", "prepare dough," and "assemble pizza." That is, plans may vary even under a shared common goal state. Aspects of the present disclosure provide a probabilistic T-step plan generator that may generate multiple feasible plans according to a probability distribution, and as such, potentially capture the stochastic property of planned procedures. Moreover, by having access to a probability distribution of multiple feasible plans may provide for the generated plans to be subsequently evaluated in terms of some other performance criteria, such as efficiency and/or safety. For example, the user provided with the multiple feasible plans may select a desired action plan from among the plurality of distinct action sequences based on at least one of efficiency criteria and safety criteria. Alternatively or additionally, the probabilistic T-step plan generator may be configured to select the desired action plan from among the plurality of distinct action sequences based on criteria provided by the user and/or predetermined criteria.

Related approaches for procedure planning for instructional videos typically rely on fully-supervised learning models that may be trained using visual representations of each intermediate step along with annotations of the start and end times of each intermediate step as well as step labels. Such annotations may be generated via laborious and error-prone processes of observing instructional videos and manually annotating the start and end times of the intermediate steps. Aspects of the present disclosure provide for mapping of visual activities and their natural language descriptions to a common representational space thereby making embedded vision features interchangeable with language features for training a probabilistic T-step plan generator. And, as a result, possibly obviating a need to perform manual annotations of the start and end times of the intermediate steps in instructional videos, that may be required by related procedure planning approaches. In addition, a language representation may be a more stable representation of the actions to be taken by the user as the natural language description of the intermediate steps may remain the same, while corresponding visual representation of the same steps may vary across multiple instructional videos.

FIG. 3 depicts an example of a probabilistic T-step plan generator, in accordance with various aspects of the present disclosure.

Referring to FIG. 3, a probabilistic T-step plan generator 320 that implements one or more aspects of the disclosure is illustrated. In some embodiments, at least a portion of the probabilistic T-step plan generator 320 may be performed by the device 100 of FIG. 1, which may include the probabilistic procedure planning component 180. Alternatively or additionally, another computing device (e.g., a server, a laptop, a smartphone, a UE, a wearable device, etc.) that includes the probabilistic procedure planning component 180 may perform at least a portion of the probabilistic T-step plan generator 320.

As shown in FIG. 3, the probabilistic T-step plan generator 320 may receive input 310 that may comprise a start state $V_{start}$ and a goal state $V_{goal}$. In some embodiments, at least one of the start state $V_{start}$ and the end state $V_{goal}$ may be indicated by an image. Alternatively or additionally, at least one of the start state and the end state may be indicated by video content (e.g., video clips). For example, the video content may be encoded using MIL-NCE. In some embodiments, the input 310 may include a time horizon T that may indicate a number of intermediate steps to be included in the action plan.

The probabilistic T-step plan generator 320 may be configured to generate an output 330 that may comprise a sequence of actions a (e.g., $\tilde{a}_1, \tilde{a}_2, \ldots, \tilde{a}_T$) for each of the T intermediate steps of the action plan. The actions a in the sequence of actions may be obtained from a pre-defined and/or fixed list of possible actions. The sequence of actions a of output 330 may represent a T-step plan for reaching the end state $V_{goal}$ from the start state $V_{start}$.

In some embodiments, the probabilistic T-step plan generator 320 may be provided with pseudo-random noise vector z 315. By sampling different noise samples from pseudo-random noise vector z 315, the probabilistic T-step plan generator 320 may output random samples from a distribution of feasible T-step plans, and, as a result, generating different feasible output plan sequences a (e.g., $\tilde{a}_1, \tilde{a}_2, \ldots, \tilde{a}_T$).

In some embodiments, the probabilistic T-step plan generator 320 may map visual activities and their natural language descriptions to a common representational space thereby making embedded vision features interchangeable with language features for training the probabilistic T-step plan generator 320.

FIG. 4 illustrates a block diagram of a probabilistic T-step plan generator, in accordance with various aspects of the present disclosure.

Referring to FIG. 4, a block diagram of the probabilistic T-step plan generator 320 that implements one or more aspects of the disclosure is illustrated. In some embodiments, at least a portion of the probabilistic T-step plan generator 320 may be performed by the device 100 of FIG. 1, which may include the probabilistic procedure planning component 180. Alternatively or additionally, another computing device (e.g., a server, a laptop, a smartphone, a UE, a wearable device, etc.) that includes the probabilistic procedure planning component 180 may perform at least a portion of the probabilistic T-step plan generator 320. In some embodiments, the probabilistic T-step plan generator 320 depicted in FIG. 4 may be similar in many respects to the probabilistic T-step plan generator 320 described with reference to FIG. 3 and may include additional features not mentioned above.

As shown in FIG. 4, the probabilistic T-step plan generator 320 may comprise an input query construction component 410 and a plan generation component 420. The input query construction component 410 may construct an input query matrix 415 that includes the visual start state $V_{start}$, the goal state $V_{goal}$, placeholders for the remaining T−1 action labels that need to be predicted, and a pseudo-random noise vector z. The plan generation component 420 may include a machine learning transformer decoder $\mathcal{T}$ 422 that may be configured to generate the action plan by processing the input query matrix 415 through a stack of N decoder blocks (e.g., decoder block A 425A, . . . , decoder block N 425N, hereinafter "425" generally), where N is an integer greater than 0. That is, the machine learning transformer decoder $\mathcal{T}$ 422 may comprise a single branch non-autoregressive model, implemented as a transformer that may generate all intermediate steps in parallel conditioned on the start and goal states.

In some embodiments, a final decoding layer of the machine learning transformer decoder $\mathcal{T}$ 422 may include at least one output head (not shown). The at least one output head may be implemented as a multi-layer perceptron (MLP). In some embodiments, a first output head may yield $h_a$ 432 with the intermediate predicted one-hot actions $\tilde{a}_t$ (e.g., $\tilde{a}_1, \tilde{a}_2, \ldots, \tilde{a}_T$), where t=1, . . . , T. In some optional or additional embodiments, the final decoding layer of the machine learning transformer decoder $\mathcal{T}$ 422 may include a second output head that may yield $h_v$ 434 with intermediate state outputs $\tilde{v}_t$ (e.g., $\tilde{v}_1, \tilde{v}_2, \ldots, \tilde{v}_T$), where t=1, . . . , T. The intermediate state outputs $\tilde{v}_t$ may be utilized during a training period of the machine learning transformer decoder $\mathcal{T}$ 422.

The input query construction component 410 may start construction of the input query matrix 415, which may also be referred to as the random query matrix $Q^Z$, by constructing a deterministic query Q with an equation similar to Equation 1.

$$Q = (q_0, q_1, q_{T-1}, q_T), \text{ with}$$

$$q_t = (q_t^{in} + p_t, \text{for } t=0, \ldots, T \quad [\text{Eq. 1}]$$

Referring to Eq. 1, $q_t$ and $p_t$ are encoded as $d_0$ dimensional embedded vectors (i.e., $q_t, p_t \in \mathbb{R}^{d_0}$), $q_0^{in}$ denotes the embedded vector for the start state $V_{start}$, and $q_T^{in}$ denotes the embedded vector for the goal state $V_{goal}$. That is, $q_0 = V_{start}$ and $q_T = V_{goal}$. For all other values of $t \in [1, \ldots, T-1]$, $q_t^{in}$ denotes constant learned query vectors that are associated with the action labels that are to be predicted. In some embodiments, the constant learned query vectors may not change (e.g., be constant) for different planning requests (e.g., different start and goal states). That is, the $q_t$ and the $q_t$ embedded vectors may be the only components of the deterministic query Q that are specific to the planning request.

Continuing to refer to Eq. 1, $p_t$ denotes a fixed cosine positional embedding vector that communicates information about the order of the elements to the machine learning transformer decoder $\mathcal{T}$ 422. Thus the deterministic query Q may be a matrix of size $[d_0 \times T+1]$ that may be obtained by stacking T+1 $d_0$ dimensional query vectors (e.g., $q_0, \ldots, q_T$). It is understood that the order of the elements may be encoded using other encoding approaches without departing from the scope of the disclosure. That is, the disclosure is not limited in this regard.

The random query matrix $Q^Z$ may be constructed by augmenting the deterministic query Q with a stochastic component, a pseudo-random noise vector z 315 through concatenation, with an equation similar to Equation 2.

$$Q^z = (q_0^z, q_1^z \ldots, q_{T-1}^z, q_T^z), \text{ with} \quad [\text{Eq. 2}]$$

$$q_t^z = \begin{bmatrix} q_t \\ z \end{bmatrix}, \text{ for } t = 0, \ldots, T$$

Referring to Eq. 2, z is a $d_1$ dimensional vector sampled from the standard normal distribution (i.e., $z \sim \mathcal{N}(0,1)$). Thus, the random query matrix $Q^Z$ may be constructed by concatenating a pseudo-random noise vector to each column of the deterministic query matrix Q. As a result, the random query matrix $Q^Z$ may be a matrix of size $[d \times T+1]$, where $d=d_0+d_1$.

The input query construction component 410 may be configured to provide the random query matrix $Q^Z$ to the plan generation component 420 as the input query matrix 415.

As shown in FIG. 4, the plan generation component 420 may include a stack of N memory-augmented transformer blocks (e.g., decoder blocks 425). Each of the N memory-augmented transformer blocks may have access to a global learnable memory unit M 427.

Referring to FIG. 5, each of the N memory-augmented transformer blocks (e.g., decoder blocks 425) may have a similar architecture. For example, each memory-augmented transformer block 425 may consist of two key operations, a multi-head self-attention operation 523 and a multi-head cross-attention operation 527.

The memory-augmented transformer block 425 may process input 510 with the multi-head self-attention operation 523. In some embodiments, the input 510 may comprise the input query matrix 415 provided by the input query construction component 410. Alternatively or additionally, the input 510 may comprise the output 530 of a preceding memory-augmented transformer block 425 in the stack of N memory-augmented transformer blocks 425.

The output of the multi-head self-attention operation 523 is then processed by the multi-head cross-attention operation 527 in combination with the global learnable memory unit M 427 to generate the output 530. The multi-head cross-attention operation 527 of each of the memory-augmented transformer blocks 425 may access the same global learnable memory unit M 427.

In some embodiments, the output 530 may be provided to a subsequent memory-augmented transformer block 425 in the stack of N memory-augmented transformer blocks 425. Alternatively or additionally, the output 530 may be provided to at least one output head (not shown) to yield $h_a$ 432 and/or $h_v$ 434.

The multi-head self-attention operation 523 and multi-head cross-attention operation 527 may refer to mapping a query (Q) and a set of key-value (K, V) pairs to an output, where the query, the set of key-value pairs, and the output are vectors tensors (e.g., matrices). Note that Q may be distinct from the input query matrix $Q^Z$ 415. The output may be computed as a weighted sum of the values, where the weight assigned to each value may be computed by a compatibility function of the query with the corresponding key. In particular, the multi-head self-attention operation 523 and multi-head cross-attention operation 527 may consist of linear algebraic and normalization operations defined over queries (Q), keys (K), and values (V).

Referring to FIGS. 4 and 5, the global learnable memory unit M 427 may comprise a set of n learnable vectors having a dimension of d, as shown in Equation 3.

$$M=(m_1, m_2, \ldots, m_n) \in \mathbb{R}^{d \times n} \quad [\text{Eq. 3}]$$

The size of the global learnable memory unit M 427 (e.g., the number of n learnable vectors in the memory) may be a hyperparameter that is independent from the time horizon T. The number n of learnable vectors stored in the global learnable memory unit M 427, along with the values for each of the n learnable vectors stored in the global learnable memory unit M 427, may be determined during a training session of the machine learning transformer decoder $\mathcal{T}$ 422. Alternatively or additionally, the global learnable memory unit M 427 may be configured as read-only memory during an operational state of the machine learning transformer decoder $\mathcal{T}$ 422.

In some embodiments, the n learnable vectors may be restricted to a given set of operations. For example, the n learnable vectors may be restricted to operations that correspond to operations of a particular appliance, software application, and/or electronic device, and the like. In such embodiments, the start state $V_{start}$ may correspond to a current state of the appliance and/or device. Alternatively or additionally, the goal state $V_{goal}$ may be indicated using natural language, such as "Start the washing machine on a delicate cycle, using cold water." The output of probabilistic T-step plan generator 320 may indicate sequences of instructions that the user could follow to achieve that goal state.

Returning to FIG. 4, the output 530 of the memory-augmented transformer blocks 425 may be denoted as $T_{am}(Q^z, M)$. The output 530 may be provided to at least one output head (not shown) to yield $h_a$ 432 and/or $h_v$ 434 to provide the output of the probabilistic T-step plan generator 320, according to Equation 4.

$$\begin{pmatrix} \hat{a}_{1:T} \\ \hat{v}_{1:T} \end{pmatrix} = \begin{pmatrix} G_a(Q^z) \\ G_v(Q^z) \end{pmatrix}, \text{ where} \quad [\text{Eq. 4}]$$

$$G_a(Q^z) := h_a(T_{am}(Q^z, M)), \text{ and}$$

$$G_v(Q^z) := h_v(T_{am}(Q^z, M))$$

The number and arrangement of components shown in FIGS. 4 and 5 are provided as an example. In practice, there may be additional components, fewer components, different components, or differently arranged components than those shown in FIGS. 4 and 5. Furthermore, two or more components shown in FIG. 4 or 5 may be implemented within a single component, or a single component shown in FIG. 4 or 5 may be implemented as multiple, distributed components. Additionally or alternatively, a set of (one or more) components shown in FIG. 4 or 5 may perform one or more functions described as being performed by another set of components shown in FIG. 4 or 5.

Figure 6:
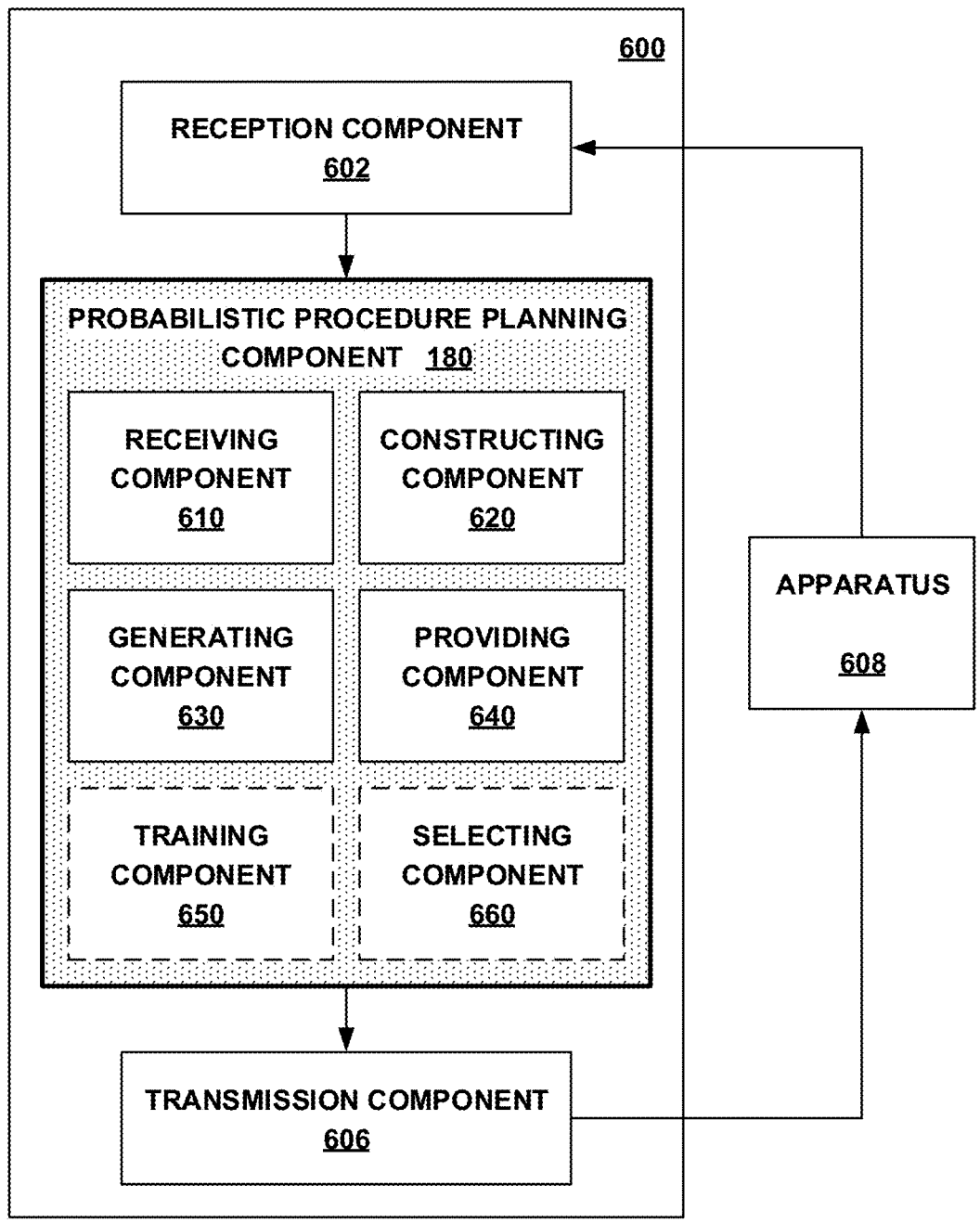
FIG. 6 illustrates a block diagram of an example apparatus for probabilistic procedure planning for generating a plan based on a goal relating to an end state, in accordance with various aspects of the present disclosure.

FIG. 6 illustrates a block diagram of an example apparatus 600 for probabilistic procedure planning for generating a plan based on a goal relating to an end state. The apparatus 600 may be a computing device (e.g., device 100 of FIG. 1) and/or a computing device may comprise the apparatus 600. In some embodiments, the apparatus 600 may comprise a reception component 602 configured to receive communications (e.g., wired, wireless) from another apparatus (e.g., apparatus 608), a probabilistic procedure planning component 180 configured to generate a plan based on a goal relating to an end state, and a transmission component 606 configured to transmit communications (e.g., wired, wireless) to another apparatus (e.g., apparatus 608). The components of the apparatus 600 may be in communication with one another (e.g., via one or more buses or electrical connections). As shown in FIG. 6, the apparatus 600 may be in communication with another apparatus 608 (such as a database, a server, or another computing device) using the reception component 602 and/or the transmission component 606.

In some embodiments, the apparatus 600 may be configured to perform one or more operations described herein in connection with FIGS. 1-5. Alternatively or additionally, the apparatus 600 may be configured to perform one or more processes described herein, such as method 700 of FIG. 7. In some embodiments, the apparatus 600 may comprise one or more components of the device 100 described above in connection with FIG. 1.

The reception component 602 may receive communications, such as control information, data communications, or a combination thereof, from the apparatus 608 (e.g., a database, a server, or another computing device). The reception component 602 may provide received communications to one or more other components of the apparatus 600, such as the probabilistic procedure planning component 180. In some embodiments, the reception component 602 may perform signal processing on the received communications, and may provide the processed signals to the one or more other components. In some embodiments, the reception component 602 may comprise one or more antennas, a receive processor, a controller/processor, a memory, or a combination thereof, of the device 100 described above in reference to FIG. 1.

The transmission component 606 may transmit communications, such as control information, data communications, or a combination thereof, to the apparatus 608 (e.g., a database, a server, or another computing device). In some embodiments, the probabilistic procedure planning component 180 may generate communications and may transmit the generated communications to the transmission component 606 for transmission to the apparatus 608. In some embodiments, the transmission component 606 may perform signal processing on the generated communications, and may transmit the processed signals to the apparatus 608. In other embodiments, the transmission component 606 may comprise one or more antennas, a transmit processor, a controller/processor, a memory, or a combination thereof, of the device 100 described above in reference to FIG. 1. In some embodiments, the transmission component 606 may be co-located with the reception component 602 such as in a transceiver and/or a transceiver component.

The probabilistic procedure planning component 180 may be configured to generate a plan based on a goal relating to an end state. In some embodiments, the probabilistic procedure planning component 180 may include a set of components, such as a receiving component 610 configured to receive a request from a user to generate an action plan, a constructing component 620 configured to construct an input query matrix, a generating component 630 configured to generate the action plan, and a providing component 640 configured to provide the action plan to the user.

Alternatively or additionally, the probabilistic procedure planning component 180 may further include a training component 650 configured to train the machine learning transformer decoder, and a selecting component 660 configured to select a desired action plan.

In some embodiments, the set of components may be separate and distinct from the probabilistic procedure planning component 180. In other embodiments, one or more components of the set of components may include or may be implemented within a controller/processor (e.g., the processor 120), a memory (e.g., the memory 130), or a combination thereof, of the device 100 described above in reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIGS. 1 and 6.

Figure 7:
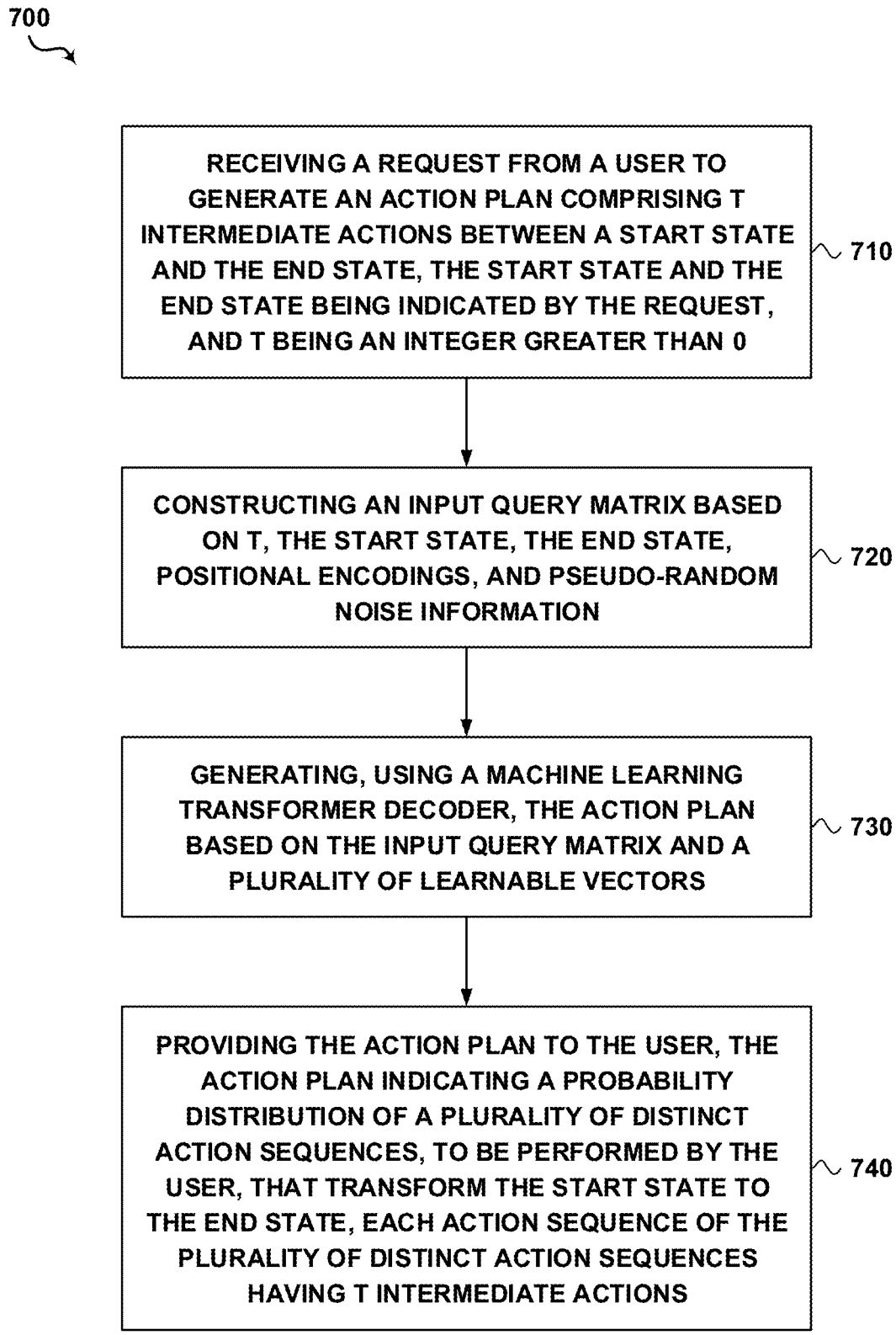
FIG. 7 depicts a flowchart of an example method of probabilistic procedure planning for generating a plan based on a goal relating to an end state, to be performed by a processor, in accordance with various aspects of the present disclosure.

Referring to FIG. 7, in operation, an apparatus 600 may perform a method 700 of probabilistic procedure planning for generating a plan based on a goal relating to an end state. The method 700 may be performed by the device 100 (which may include the processor 120, the memory 130, and the storage component 140, and which may be the entire device 100 and/or include one or more components of the device 100, such as the input component 150, the output component 160, the communication interface 170, and/or the probabilistic procedure planning component 180). The method 700 may be performed by the device 100 and/or the probabilistic procedure planning component 180 in communication with the apparatus 608 (e.g., a database, a server, or another computing device).

At block 710 of FIG. 7, the method 700 may include receiving a request from a user to generate an action plan comprising T intermediate actions between a start state and the end state, the start state and the end state being indicated by the request, and T being an integer greater than 0. For example, in an aspect, the device 100, the probabilistic procedure planning component 180, and/or the receiving component 610 may be configured to or may comprise means for receiving a request from a user to generate an action plan comprising T intermediate actions between a start state and the end state, the start state and the end state being indicated by the request, and T being an integer greater than 0.

For example, the receiving at block 710 may include receiving a request to generate the action plan that may include a value of T.

At block 720 of FIG. 7, the method 700 may include constructing an input query matrix based on T, the start state, the end state, positional encodings, and pseudo-random noise information. For example, in an aspect, the device 100, the probabilistic procedure planning component 180, and/or the constructing component 620 may be configured to or may comprise means for constructing an input query matrix based on T, the start state, the end state, positional encodings, and pseudo-random noise information.

For example, the constructing at block 720 may include calculating a first embedded vector corresponding to the start state. The constructing at block 720 may further include calculating a last embedded vector corresponding to the end state. The constructing at block 720 may further include generating T−1 query vectors. The constructing at block 720 may further include generating T+1 positional embeddings. The constructing at block 720 may further include combining the T+1 positional embeddings with the first embedded vector, the last embedded vector, the T−1 constant learned query vectors to result in T+1 positionally embedded vectors. The constructing at block 720 may further include stacking the T+1 positionally embedded vectors into a deterministic query matrix. The constructing at block 720 may further include concatenating a pseudo-random noise vector to each column of the deterministic query matrix to construct the input query matrix.

In other optional or additional aspects, in the constructing at block 720, dimensions of each of the first embedded vector, the last embedded vector, and the T−1 constant learned query vectors may be a same dimension.

At block 730 of FIG. 7, the method 700 may include generating, using a machine learning transformer decoder, the action plan based on the input query matrix and a plurality of learnable vectors. For example, in an aspect, the device 100, the probabilistic procedure planning component 180, and/or the generating component 630 may be configured to or may comprise means for generating, using a machine learning transformer decoder, the action plan based on the input query matrix and a plurality of learnable vectors.

For example, the generating at block 730 may include performing a multi-head self-attention operation on the input query matrix. In such aspects, the generating at block 730 may further include performing a multi-head cross-attention operation on a result of the multi-head self-attention operation using the plurality of learnable vectors. In such aspects, the generating at block 730 may further include processing a result of the multi-head cross-attention operation with an MLP to generate a one-hot encoded action vector for each of the T intermediate actions.

At block 740 of FIG. 7, the method 700 may include providing the action plan to the user, the action plan indicating a probability distribution of a plurality of distinct action sequences, to be performed by the user, that transform the start state to the end state, each action sequence of the plurality of distinct action sequences having T intermediate actions. For example, in an aspect, the device 100, the probabilistic procedure planning component 180, and/or the providing component 640 may be configured to or may comprise means for providing the action plan to the user, the action plan indicating a probability distribution of a plurality of distinct action sequences, to be performed by the user, that transform the start state to the end state, each action sequence of the plurality of distinct action sequences having T intermediate actions.

In an optional or additional aspect that may be combined with any other aspect, the method 700 may include training the machine learning transformer decoder using a weakly supervised approach by inputting a plurality of start states and end states and a plurality of NL descriptions of actions. For example, in an aspect, the device 100, the probabilistic procedure planning component 180, and/or the training component 650 may be configured to or may comprise means for training the machine learning transformer decoder using a weakly supervised approach by inputting a plurality of start states and end states and a plurality of NL descriptions of actions.

In another optional or additional aspect that may be combined with any other aspect, the method 700 may include selecting a desired action plan from among the plurality of distinct action sequences based on at least one of efficiency criteria and safety criteria. For example, in an aspect, the device 100, the probabilistic procedure planning component 180, and/or the selecting component 660 may be configured to or may comprise means for selecting a desired action plan from among the plurality of distinct action sequences based on at least one of efficiency criteria and safety criteria.

In another optional or additional aspect that may be combined with any other aspect, at least one of the start state and the end state may be indicated by an image.

In another optional or additional aspect that may be combined with any other aspect, at least one of the start state and the end state are indicated by video content.

In another optional or additional aspect that may be combined with any other aspect, the video content is encoded using MIL-NCE.

In another optional or additional aspect that may be combined with any other aspect, the plurality of distinct action sequences may indicate intermediate instructions to be followed by the user to reach the end state.

The following aspects are illustrative only and aspects thereof may be combined with aspects of other embodiments or teaching described herein, without limitation.

Aspect 1 is a method of probabilistic procedure planning for generating a plan based on a goal relating to an end state, to be performed by a processor. The method includes receiving a request from a user to generate an action plan comprising T intermediate actions between a start state and the end state. The start state and the end state are indicated by the request. T is an integer greater than 0. The method further includes constructing an input query matrix based on T, the start state, the end state, positional encodings, and pseudo-random noise information. The method further includes generating, using a machine learning transformer decoder, the action plan based on the input query matrix and a plurality of learnable vectors. The method further includes providing the action plan to the user. The action plan indicates a probability distribution of a plurality of distinct action sequences, to be performed by the user, that transform the start state to the end state. Each action sequence of the plurality of distinct action sequences has T intermediate actions.

In Aspect 2, the method of Aspect 1 may include training the machine learning transformer decoder using a weakly supervised approach by inputting a plurality of start states and end states and a plurality of NL descriptions of actions.

In Aspect 3, the method of any of Aspects 1 or 2 may include selecting a desired action plan from among the plurality of distinct action sequences based on at least one of efficiency criteria and safety criteria.

In Aspect 4, the method of any of Aspects 1 to 3 may include receiving the request to generate the action plan, the request comprising a value of T.

In Aspect 5, the method of any of Aspects 1 to 4 may include calculating a first embedded vector corresponding to the start state, calculating a last embedded vector corresponding to the end state, obtaining T−1 constant learned query vectors, generating T+1 positional embeddings, combining the T+1 positional embeddings with the first embedded vector, the last embedded vector, the T−1 constant learned query vectors to result in T+1 positionally embedded vectors; stacking the T+1 positionally embedded vectors into a deterministic query matrix, and concatenating a pseudo-random noise vector to each column of the deterministic query matrix to construct the input query matrix.

In Aspect 6, in the method of any of Aspects 1 to 5, dimensions of each of the first embedded vector, the last embedded vector, and the T−1 constant learned query vectors may be a same dimension.

In Aspect 7, the method of any of Aspects 1 to 6 may include performing a multi-head self-attention operation on the input query matrix, performing a multi-head cross-attention operation on a result of the multi-head self-attention operation using the plurality of learnable vectors, and processing a result of the multi-head cross-attention operation with an MLP to generate a one-hot encoded action vector for each of the T intermediate actions.

In Aspect 8, in the method of any of Aspects 1 to 7, the plurality of learnable vectors may correspond to operations of an appliance.

In Aspect 9, in the method of any of Aspects 1 to 8, at least one of the start state and the end state may be indicated by an image.

In Aspect 10, in the method of any of Aspects 1 to 9, at least one of the start state and the end state are indicated by video content.

In Aspect 11, in the method of any of Aspects 1 to 10, a video content may be encoded using MIL-NCE.

In Aspect 12, in the method of any of Aspects 1 to 11, the plurality of distinct action sequences may indicate intermediate instructions to be followed by the user to reach the end state.

Aspect 13 is an apparatus for probabilistic procedure planning for generating a plan based on a goal relating to an end state. The apparatus includes a memory storage storing computer-executable instructions, and a processor communicatively coupled to the memory storage. The processor is configured to execute the computer-executable instructions and cause the apparatus to perform one or more of the methods of any of Aspects 1 to 12.

Aspect 14 is an apparatus for probabilistic procedure planning for generating a plan based on a goal relating to an end state to be performed by a device including means for performing one or more of the methods of any of Aspects 1 to 12.

Aspect 15 is a non-transitory computer-readable storage medium storing computer-executable instructions for probabilistic procedure planning for generating a plan based on a goal relating to an end state to be performed by a device. The computer-executable instructions are configured, when executed by one or more processors of the device, to cause the device to perform one or more of the methods of any of Aspects 1 to 12.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 and 6) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc., that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method of probabilistic procedure planning for generating a plan based on a goal relating to an end state, to be performed by a processor, comprising:
   receiving a request from a user to generate an action plan comprising T intermediate actions between a start state and the end state, the start state and the end state being indicated by the request, and T being an integer greater than 0;
   constructing an input query matrix based on T, the start state, the end state, positional encodings, and pseudo-random noise information;
   generating, using a machine learning transformer decoder, the action plan based on the input query matrix and a plurality of learnable vectors; and
   providing the action plan to the user, the action plan indicating a probability distribution of a plurality of distinct action sequences, to be performed by the user, that transform the start state to the end state, each action sequence of the plurality of distinct action sequences having T intermediate actions.

2. The method of claim 1, further comprising:
training the machine learning transformer decoder using a weakly supervised approach by inputting a plurality of start states and end states and a plurality of natural language (NL) descriptions of actions.

3. The method of claim 1, further comprising:
selecting a desired action plan from among the plurality of distinct action sequences based on at least one of efficiency criteria and safety criteria.

4. The method of claim 1, wherein the receiving of the request comprises:
receiving the request to generate the action plan, the request comprising a value of T.

5. The method of claim 1, wherein the constructing of the input query matrix comprises:
calculating a first embedded vector corresponding to the start state;
calculating a last embedded vector corresponding to the end state;
obtaining T−1 constant learned query vectors;
generating T+1 positional embeddings;
combining the T+1 positional embeddings with the first embedded vector, the last embedded vector, the T−1 constant learned query vectors to result in T+1 positionally embedded vectors;
stacking the T+1 positionally embedded vectors into a deterministic query matrix; and
concatenating a pseudo-random noise vector to each column of the deterministic query matrix to construct the input query matrix.

6. The method of claim 5, wherein
dimensions of each of the first embedded vector, the last embedded vector, and the T−1 constant learned query vectors are a same dimension.

7. The method of claim 1, wherein the generating of the action plan comprises:
performing a multi-head self-attention operation on the input query matrix;
performing a multi-head cross-attention operation on a result of the multi-head self-attention operation using the plurality of learnable vectors; and
processing a result of the multi-head cross-attention operation with a multi-layer perceptron (MLP) to generate a one-hot encoded action vector for each of the T intermediate actions.

8. The method of claim 1, wherein the plurality of learnable vectors corresponds to operations of an appliance.

9. The method of claim 1, wherein:
at least one of the start state and the end state are indicated by an image.

10. The method of claim 1, wherein:
at least one of the start state and the end state are indicated by video content.

11. The method of claim 10, wherein the video content is encoded using multiple instance learning noise contrastive estimation (MIL-NCE).

12. The method of claim 1, wherein the plurality of distinct action sequences indicate intermediate instructions to be followed by the user to reach the end state.

13. An apparatus for probabilistic procedure planning for generating a plan based on a goal relating to an end state, comprising:

a memory storage storing computer-executable instructions; and
a processor communicatively coupled to the memory storage, wherein the processor is configured to execute the computer-executable instructions and cause the apparatus to:
receive a request from a user to generate an action plan comprising T intermediate actions between a start state and the end state, the start state and the end state being indicated by the request, and T being an integer greater than 0;
construct an input query matrix based on T, the start state, the end state, positional encodings, and pseudo-random noise information;
generate, using a machine learning transformer decoder, the action plan based on the input query matrix and a plurality of learnable vectors; and
provide the action plan to the user, the action plan indicating a probability distribution of a plurality of distinct action sequences, to be performed by the user, that transform the start state to the end state, each action sequence of the plurality of distinct action sequences having T intermediate actions.

14. The apparatus of claim 13, wherein the processor is further configured to execute further computer-executable instructions and further cause the apparatus to:
train the machine learning transformer decoder using a weakly supervised approach by inputting a plurality of start states and end states and a plurality of natural language (NL) descriptions of actions.

15. The apparatus of claim 13, wherein the processor is further configured to execute further computer-executable instructions and further cause the apparatus to:
select a desired action plan from among the plurality of distinct action sequences based on at least one of efficiency criteria and safety criteria.

16. The apparatus of claim 13, wherein the computer-executable instructions to receive the request further cause the apparatus to:
receive the request to generate the action plan, the request comprising a value of T.

17. The apparatus of claim 13, wherein the computer-executable instructions to construct the input query matrix further cause the apparatus to:
calculate a first embedded vector corresponding to the start state;
calculate a last embedded vector corresponding to the end state;
obtain T−1 constant learned query vectors;
generate T+1 positional embeddings;
combine the T+1 positional embeddings with the first embedded vector, the last embedded vector, the T−1 constant learned query vectors to result in T+1 positionally embedded vectors;
stack the T+1 positionally embedded vectors into a deterministic query matrix; and
concatenate a pseudo-random noise vector to each column of the deterministic query matrix to construct the input query matrix,
wherein dimensions of each of the first embedded vector, the last embedded vector, and the T−1 constant learned query vectors are a same dimension.

18. The apparatus of claim 17, wherein the computer-executable instructions to generate the action plan further cause the apparatus to:
perform a multi-head self-attention operation on the input query matrix;

perform a multi-head cross-attention operation on a result of the multi-head self-attention operation using the plurality of learnable vectors; and process a result of the multi-head cross-attention operation with a multi-layer perceptron (MLP) to generate a one-hot encoded action vector for each of the T intermediate actions.

19. The apparatus of claim 17, wherein:
at least one of the start state and the end state are indicated by an image, or
at least one of the start state and the end state are indicated by video content, wherein the video content is encoded using multiple instance learning noise contrastive estimation (MIL-NCE).

20. The apparatus of claim 17, wherein the plurality of distinct action sequences indicate intermediate instructions to be followed by the user to reach the end state.

* * * * *